(12) United States Patent
Yano

(10) Patent No.: US 7,946,645 B2
(45) Date of Patent: May 24, 2011

(54) VEHICLE BODY FRONT PORTION STRUCTURE

(75) Inventor: Norimasa Yano, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/811,164

(22) PCT Filed: Feb. 6, 2009

(86) PCT No.: PCT/IB2009/000207
§ 371 (c)(1),
(2), (4) Date: Jun. 29, 2010

(87) PCT Pub. No.: WO2009/098579
PCT Pub. Date: Aug. 13, 2009

(65) Prior Publication Data
US 2010/0301636 A1    Dec. 2, 2010

(30) Foreign Application Priority Data

Feb. 8, 2008   (JP) .................................. 2008-029415

(51) Int. Cl.
*B62D 39/00* (2006.01)
(52) U.S. Cl. ........................................ 296/192
(58) Field of Classification Search .................. 296/192, 296/193.09, 203.02
See application file for complete search history.

(56) References Cited

U.S. PATENT DOCUMENTS

| 4,545,612 | A |   | 10/1985 | Harasaki |           |
|-----------|---|---|---------|----------|-----------|
| 4,669,776 | A |   | 6/1987  | Harasaki |           |
| 4,938,526 | A | * | 7/1990  | Sannomiya et al. | 296/192 |
| 4,964,672 | A | * | 10/1990 | Fujii | 296/192 |
| 4,976,491 | A | * | 12/1990 | Hashimoto et al. | 296/192 |
| 6,869,134 | B2 | * | 3/2005 | Kato et al. | 296/192 |
| 2003/0178873 | A1 | * | 9/2003 | Kato et al. | 296/192 |

FOREIGN PATENT DOCUMENTS

GB   765 044        1/1957
JP   2005 206109    8/2005

\* cited by examiner

*Primary Examiner* — Lori L Lyjak
(74) *Attorney, Agent, or Firm* — Oblon, Spivak, McClelland, Maier & Neustadt, L.L.P.

(57) ABSTRACT

A vehicular body front portion structure includes a cowl panel and a dash panel that extends below the cowl panel. The cowl panel has a concave body with an opening formed on the upper side when viewed from the side of the vehicle body. The concave body is formed from a front plate portion, a bottom plate portion, and a rear plate portion. The cowl panel is spot-welded to the front plate portion. A drainage groove that extends in the vehicle width direction of the vehicle body is provided in a front end portion of the bottom plate portion. An in-groove recessed portion, which is recessed from the drainage groove on the lower side of the concave body and which inhibits the dash panel from detaching from the cowl panel, is formed in the bottom of the drainage groove.

12 Claims, 6 Drawing Sheets

VEHICLE BODY FRONT PORTION STRUCTURE

BACKGROUND OF THE INVENTION

1. Field of the Invention

The invention relates to a vehicle body front portion structure that includes a cowl panel and a dash panel.

2. Description of the Related Art

Japanese Patent Application Publication No. 2005-206109 (JP-A-2005-206109), for example, describes one related vehicle front portion structure in which a long and generally plate-like cowl panel serving as an upper member is joined to an upper end of a dash panel that is fixed to a rear end of a front side member.

However, with this structure, when vertical load is applied from the front suspension, the front side member becomes vertically displaced, causing the joined portion where the cowl panel and the dash panel are joined to deform in such a way (i.e., direction) that the dash panel tends to detach from the cowl panel at the joined portion. As a result, stress tends to concentrate at the joined portion of those panels.

SUMMARY OF THE INVENTION

This invention thus provides a vehicle body front portion structure that is able to reduce the concentration of stress generated at the joined portion of the cowl panel and the dash panel.

A first aspect of the invention relates to a vehicular body front portion structure provided with a cowl panel having a concave body with an opening formed on an upper side when viewed from the side of the vehicle body, and a dash panel which is joined to a front face of the curved body and extends below the cowl panel. A drainage groove that extends in a vehicle width direction of the vehicle body is provided in a front end side lower portion of the concave body, and an in-groove recessed portion, which is recessed from the drainage groove on the lower side of the concave body and which inhibits the dash panel from detaching from the cowl panel, is formed in the bottom of the drainage groove.

Forming the in-groove recessed portion in the bottom of the drainage groove of the cowl panel in this way increases the distance from the fulcrum of deformation of the cowl panel to the joined portion where the cowl panel and the dash panel are joined. This increased distance inhibits the panels from detaching from one another at the joined portion even if the joined portion of the cowl panel and the dash panel deforms in such a way that the dash panel tends to detach from the cowl panel when a vertical load is input from the front suspension. As a result, the concentration of stress generated at the joined portion of the cowl panel and the dash panel can be reduced.

A pair of front side members that extend toward the front of the vehicle body may be attached to the left and right sides of the dash panel, and the in-groove recessed portion may be formed in a portion corresponding to the inside region between the pair of front side members in the bottom of the drainage groove. When a vertical load is input from the front suspension, deformation such that the dash panel tends to detach from the cowl panel at the joined portion tends to occur at the portion corresponding to the inside region between the pair of front side members. Therefore, it is effective to form the in-groove recessed portion at the portion corresponding to the inside region between the pair of front side members in the bottom of the drainage groove.

A second aspect of the invention relates to a vehicle body front portion structure that includes a cowl panel having a concave portion with an opening formed on an upper side when viewed from the side of the vehicle body, and a dash panel which is joined to a front face of the curved body and extends below the cowl panel. The concave portion has a first recessed portion between the concave portion and the dash panel. The first recessed portion has a second recessed portion that is recessed even more than the first recessed portion.

Accordingly, the invention makes it possible to reduce the concentration stress generated at the joined portion of the cowl panel and the dash panel. As a result, the durability (strength) of the joined portion of both panels can be increased, thereby enabling the cowl panel to be made thinner which in turn reduces the weight of the cowl panel.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Hereinafter, example embodiments of a vehicle body front portion structure of the invention will be described in detail with reference to the drawings.

Figure 1:
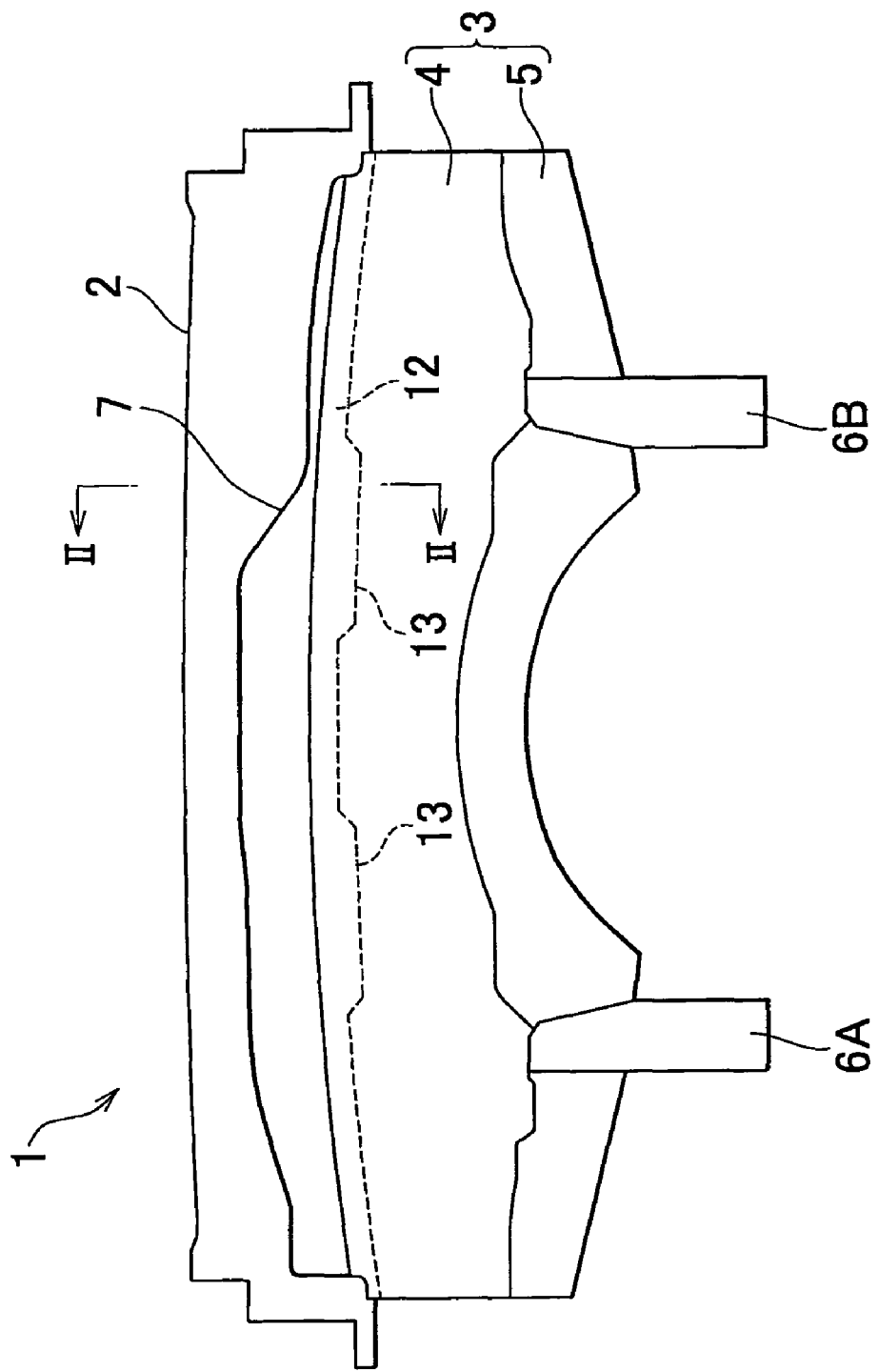
FIG. 1 is a front view schematically showing a vehicle body front portion structure according to an example embodiment of the invention.
Figure 2:
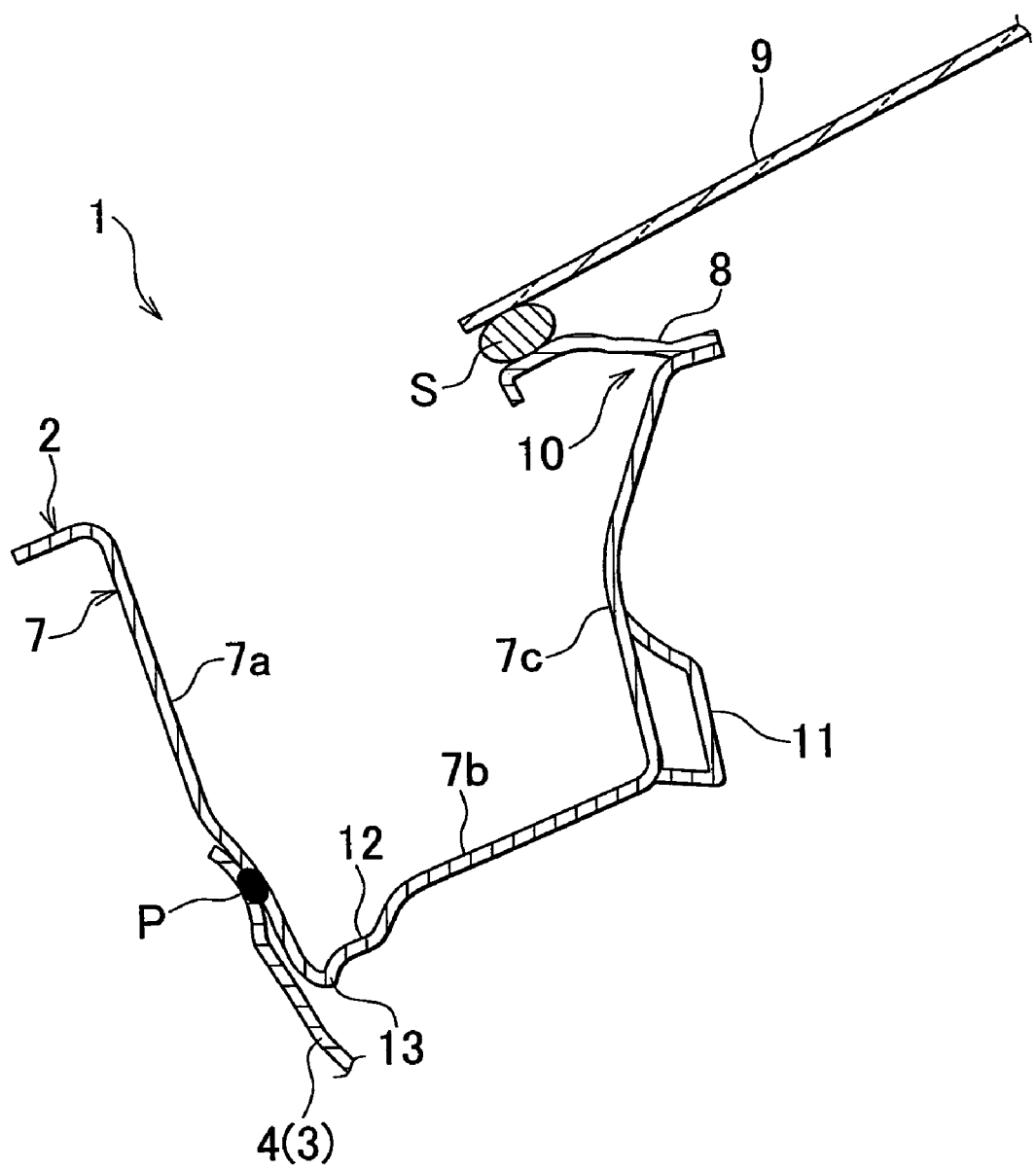
FIG. 2 is a sectional view taken along line II-II in FIG. 1.

FIG. 1 is a front view schematically showing a vehicle body front portion structure according to an example embodiment of the invention, and FIG. 2 is a sectional view taken along line II-II in FIG. 1. In the drawings, the vehicle body front portion structure 1 in this example embodiment includes a plate-like cowl panel 2 and a plate-like dash panel 3 which is joined to the cowl panel 2 and extends below the cowl panel 2.

The dash panel 3 is formed of a dash upper 4 that is joined to the cowl panel 2, and a dash lower 5 that is provided on the underside of the dash upper 4. The lower portion of the dash lower 5 is joined to a front floor, not shown, and the left and right ends of the dash lower 5 are joined to a floor pillar, also not shown. Further, front side members 6A and 6B which extend toward the front of the vehicle body are located on the left and right sides, respectively, of the front end face of the dash lower 5.

The cowl panel 2 has a concave body 7 with an opening formed on the upper side when viewed from the side of the vehicle body. The concave body 7 is made up of a front plate portion 7a, a bottom plate portion 7b, and a rear plate portion 7c. The dash upper 4 described above is spot-welded to the front plate portion 7a.

A reinforcing portion 8 is joined to the upper end portion (i.e., the rear end portion) of the rear plate portion 7c. A windshield 9 is joined with an adhesive S to the reinforcing portion 8. An upper portion of the rear plate portion 7c is curved toward the rear. This curved portion and the reinforcing portion 8 together form an impact reduction zone 10 designed to protect a pedestrian in the event of a collision. Also, a cowl reinforcement 11 is joined to a lower portion of the rear plate portion 7c. Incidentally, the reinforcing portion 8 may be omitted and the concave body 7 joined directly to the windshield 9 instead.

A drainage groove 12 that extends in the vehicle width direction of the vehicle body is formed in a front end portion of the bottom plate portion 7b. This drainage groove 12 forms a recess in the lower side of the concave body 7. The depth and shape of the drainage groove 12 are determined according to their ability to enable rainwater to flow and the like. The drainage groove 12 may be regarded as a first recessed portion of the invention.

Figure 3:
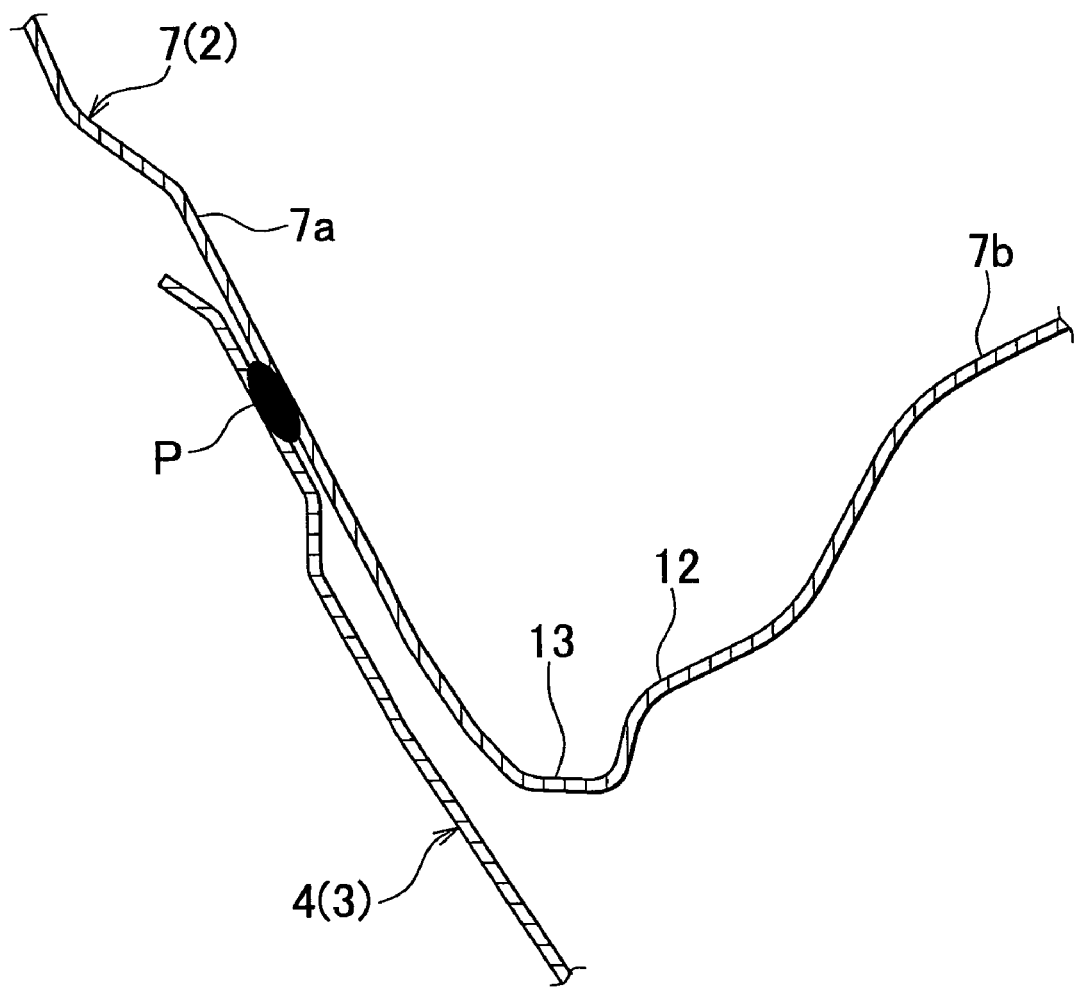
FIG. 3 is an enlarged sectional view of a portion that includes a drainage groove of a cowl panel shown in FIG. 2.

As shown in FIG. 3, an in-groove recessed portion 13 which is recessed even deeper than the drainage groove 12 on the lower side of the concave portion 7 is formed in the bottom portion of the drainage groove 12. This in-groove recessed portion 13 is designed to inhibit the dash panel 3 from separating from the cowl panel 2. The front face of the in-groove recessed portion 13 is formed continuous with the front plate portion 7a of the concave body 7 so as to extend generally straight down. The in-groove recessed portion 13 may be regarded as a second recessed portion of the invention.

Also, the in-groove recessed portion 13 is preferably formed in a portion that corresponds to an inside region between the front side members 6A and 6B provided lower than the drainage groove 12, as shown in FIG. 1. At this time, with the structure shown in FIG. 1, the in-groove recessed portion 13 is formed on both the left and right sides of the cowl panel 2. Alternatively, however, depending on the combination of shapes and the like of the dash panel 3 and the cowl panel 2, for example, the in-groove recessed portion 13 may be provided on only one side of the cowl panel 2, or it may be provided continuously from one side of the cowl panel 2 to the other.

When traveling on a bumpy road, for example, a vertical jolting load is input from the front suspension, not shown. This load vertically displaces the front side members 6A and 6B via front suspension towers, not shown. The vertical displacement of the front side members 6A and 6B is converted into longitudinal displacement of the dash panel 3, which causes the dash panel 3 to separate from the cowl panel 3 where the two are welded together, i.e., at the weld (i.e., the joined portion) P. This kind of separation of the dash panel 3 from the cowl panel 2 tends to occur particularly in the inside region between the front side members 6A and 6B.

Figure 4:
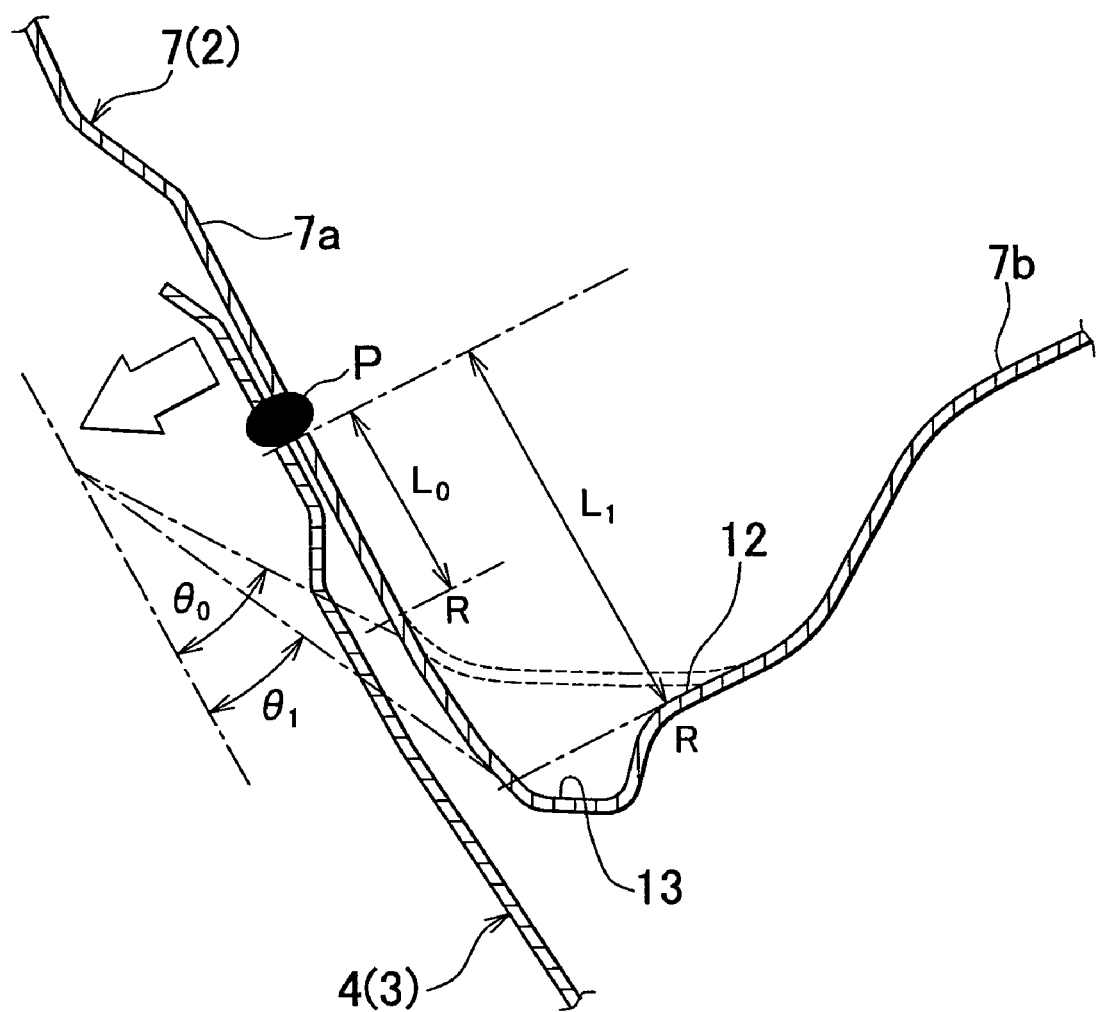
FIG. 4 is a view showing a comparison of the change in angle with respect to forward displacement of a dash panel in a case where an in-groove recessed portion shown in FIG. 3 is formed and a case where the in-groove recessed portion shown in FIG. 3 is not formed.

Here, as shown in FIG. 4, when the in-groove recessed portion 13 is not formed in the bottom of the drainage groove 12 (see the broken line in the drawing), the distance from portion R, which is the fulcrum of deformation of the cowl panel 2, to the point of the weld P is $L_0$, and the change in the angle with respect to forward displacement of the dash panel 3 is $\theta_0$. On the other hand, with a structure in which the in-groove recessed portion 13 is formed in the bottom of the drainage groove 12 as is the case in this example embodiment, the distance from portion R, which is the fulcrum of deformation of the cowl panel 2, to the point of the weld P is $L_1$ which is longer than $L_0$, so the change in the angle with respect to forward displacement of the dash cowl 3 is reduced to $\theta_1$. Accordingly, forming the in-groove recessed portion 13 in the bottom of the drainage groove 12 decreases the likelihood that the dash panel 3 will detach from the cowl panel 2 at the weld P (reduces the likelihood that the weld P between the dash panel 3 and the cowl panel 2 will fail).

Also, when the drainage groove 12 and the in-groove recessed portion 13 are provided, the actual length of the cowl panel 2 from portion R, which is the fulcrum of deformation of the cowl panel 2, to the point of the weld P increases (i.e., which results in there being that much more room for the drainage groove 12 and the in-groove recessed portion 13 to give) so the dash panel 3 can be prevented from detaching from the cowl panel 2. That is, the drainage groove 12 and the in-groove recessed portion 13 are able to deform more, thereby preventing the dash panel 3 from detaching from the cowl panel 2.

Figure 5:
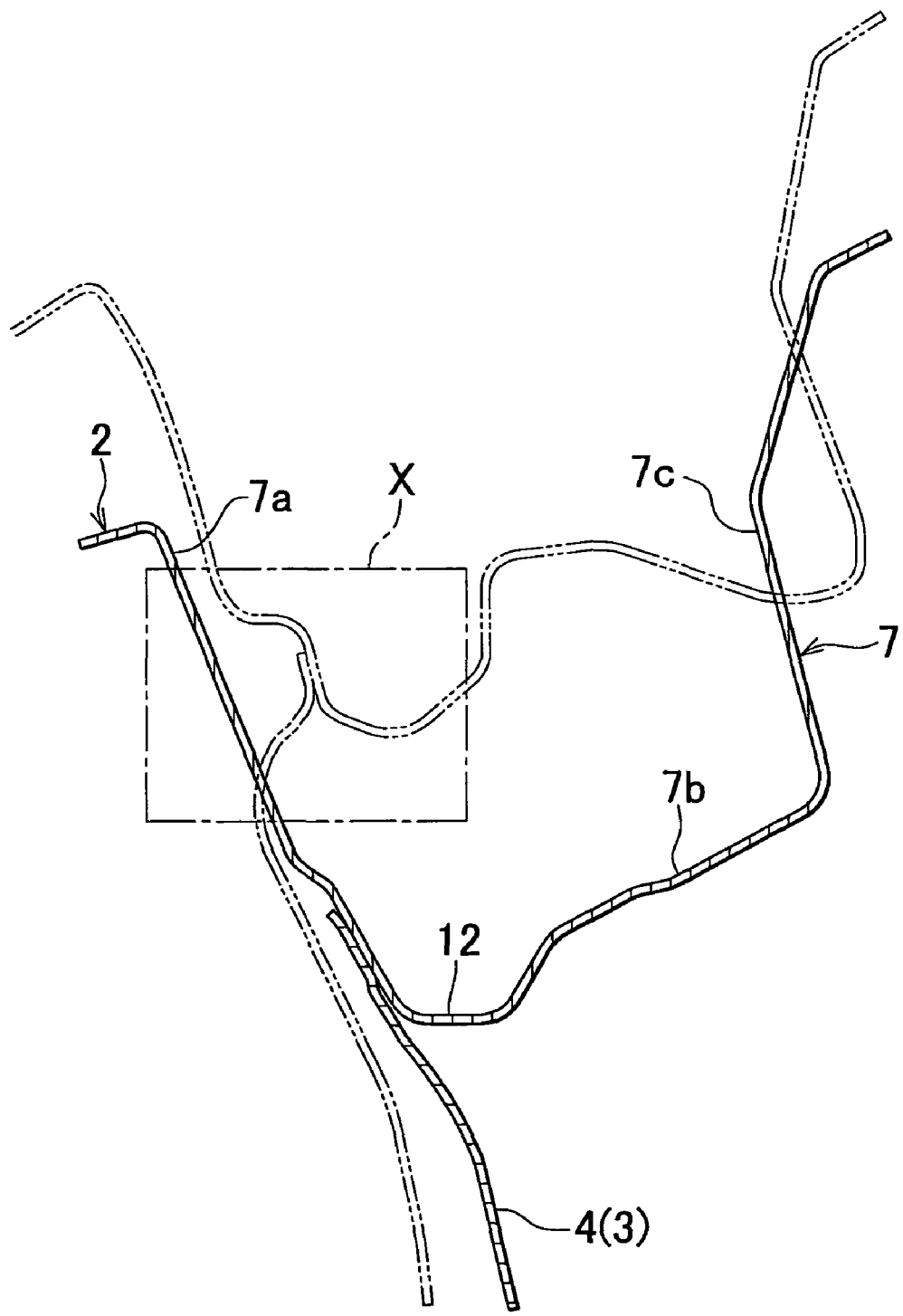
FIG. 5 is a view showing the exaggerated results of simulating the state of the cowl panel and the dash panel after deformation when the in-groove recessed portion shown in FIG. 3 is not formed.

FIG. 5 is a view showing the results from simulating the state of the cowl panel and the dash panel after they have been deformed from a vertical load applied from the front suspension, not shown, in a case in which the in-groove recessed portion 13 is not formed in the bottom of the drainage groove 12. Incidentally, in FIG. 5 the scale of deformation is shown exaggerated to facilitate understanding of the state after deformation shown by the alternate long and two short dashes line.

Figure 6:
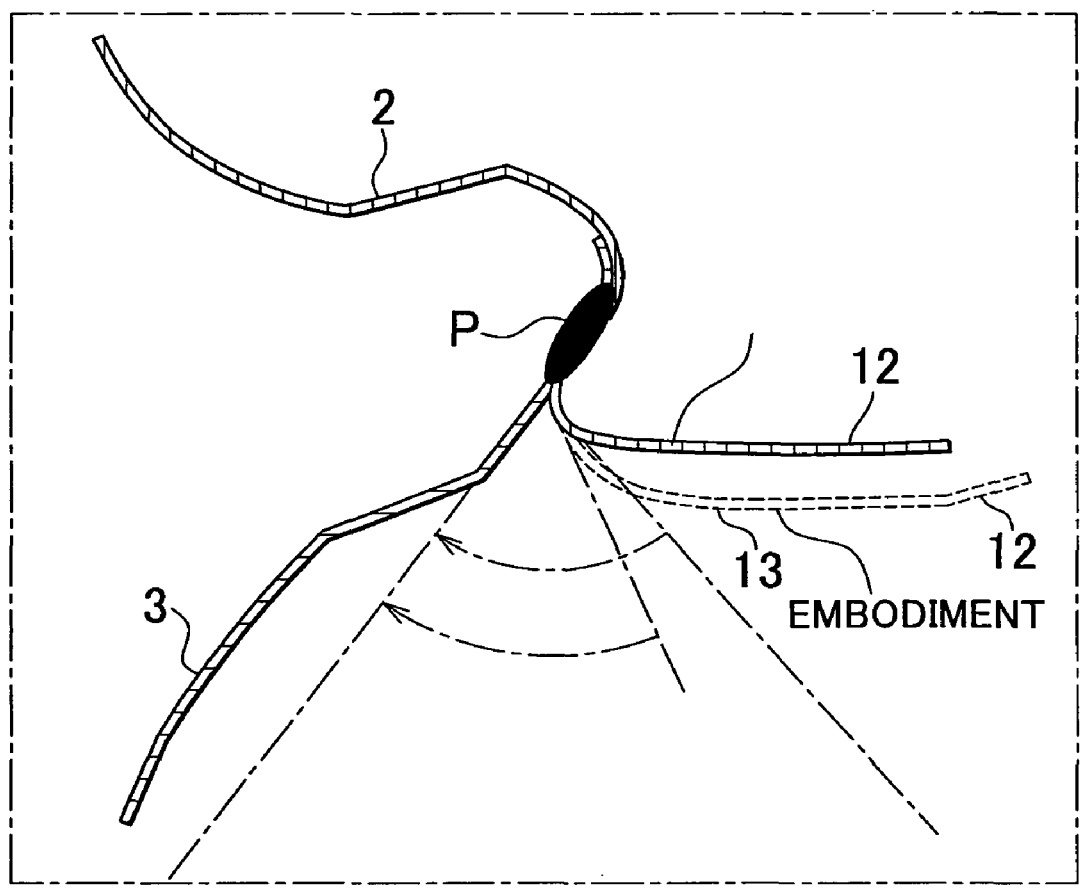
FIG. 6 is an enlarged view of a portion X (in the state after deformation) shown in FIG. 5.

FIG. 6 is an enlarged view of a portion X (in the state after deformation) shown in FIG. 5. From the drawing it is apparent that the angle when the dash panel 3 starts to detach from the cowl panel 2 is smaller when the in-groove recessed portion 13 is formed in the bottom of the drainage groove 12 (see the broken line in the drawing), as in this example embodiment, compared to when the in-groove recessed portion 13 is not formed in the bottom of the drainage groove 12.

As described above, in the example embodiment, the in-groove recessed portion 13 is formed in the bottom of the drainage groove 12. This reduces the stress that concentrates at the weld P between the cowl panel 2 and the dash panel 3, thus inhibiting the dash panel 3 from detaching from the cowl panel 2 at the weld P as described above. Accordingly, the durability (strength) of the weld P increases so the cowl panel 2 can be made that much thinner. As a result, high durability (strength) of the cowl panel 2 can be ensured while the weight of the cowl panel 2 can be reduced.

Also, the stroke amount of the impact reduction zone 10 to protect a pedestrian in the event of a collision increases due to the cowl panel 2 being thinner and lighter. As a result, the pedestrian protection performance of the cowl panel 2 can be improved.

Also, forming the in-groove recessed portion 13 in the bottom of the drainage groove 12 results in less the surface area of the cowl panel 2 than does making the bottom of the drainage groove 12 lower across the entire length. As a result, the weight of the cowl panel 2 can be further reduced. Moreover, the in-groove recessed portion 13 can be formed only in appropriate portions in the bottom of the drainage groove 12 taking into account the space around the cowl panel 2 and the dash panel 3. Also, the curved portion of the cowl panel 2 increases so the strength of the cowl panel 2 against deformation can be maintained, even if the cowl panel 2 is made thiner.

Incidentally, the invention is not limited to the example embodiments described above. For example, in the foregoing example embodiments the concave body 7 of the cowl panel 2 is formed from the front plate portion 7a, the bottom plate portion 7b, and the rear plate portion 7c. However, the structure of the concave body is not limited to this. For example, it may instead have a curved cross-section or the like.

The invention claimed is:

1. A vehicle body front portion structure comprising:
   a cowl panel having a concave portion with an opening formed on an upper side when viewed from the side of the vehicle body, the concave portion including a front plate portion, a bottom plate portion and a rear plate portion; and
   a dash panel which is joined to the front plate portion of the concave portion and extends below the cowl panel,
   wherein the concave portion has a first recessed portion provided on the bottom plate portion of the concave portion between the concave portion and the dash panel, and
   a second recessed portion is provided on a bottom portion of the first recessed portion that is recessed even more than the first recessed portion, and a front face of the second recessed portion is formed continuous with the front plate portion of the concave portion.

2. The vehicle body front portion structure according to claim 1, wherein the first recessed portion is a groove.

3. The vehicle body front portion structure according to claim 1, further comprising:
   a front side member that is joined to the cowl panel,
   wherein the second recessed portion is provided at least in a position corresponding to the front side member.

4. The vehicle body front portion structure according to claim 3, wherein the front side member is a pair of front side members, and the second recessed portion is provided in a portion that corresponds to an inside region between the pair of front side members.

5. The vehicle body front portion structure according to claim 3, wherein the front side member is a pair of front side members, and the second recessed portion is a continuous groove in a position corresponding to an inside area between the pair of front side members.

6. The vehicle body front portion structure according to claim 2, further comprising:
   a front side member that is joined to the cowl panel,
   wherein the second recessed portion is provided at least in a position corresponding to the front side member.

7. The vehicle body front portion structure according to claim 6, wherein the front side member is a pair of front side members, and the second recessed portion is provided in a portion that corresponds to an inside region between the pair of front side members.

8. The vehicle body front portion structure according to claim 6, wherein the front side member is a pair of front side members, and the second recessed portion is a continuous groove in a position corresponding to an inside area between the pair of front side members.

9. The vehicle body front portion structure according to claim 1, wherein the dash panel is welded to the front plate portion of the concave portion.

10. The vehicle body front portion structure according to claim 1, wherein a reinforcing portion is joined to an upper end portion of the rear plate portion of the concave portion.

11. The vehicle body front portion structure according to claim 10, wherein a windshield is joined with an adhesive to the reinforcing portion.

12. The vehicle body front portion structure according to claim 10, wherein a cowl reinforcement is joined to a lower portion of the rear plate portion of the concave portion.

* * * * *